United States Patent
Borsa et al.

(10) Patent No.: US 8,776,551 B2
(45) Date of Patent: Jul. 15, 2014

(54) TRANSVERSE ROW BUSHINGS HAVING CERAMIC SUPPORTS

(75) Inventors: Alessandro G. Borsa, Evergreen, CO (US); Jason Blush, Lakewood, CO (US); Barry Fitzpatrick, Lakewood, CO (US); Frank Anderson, Golden, CO (US)

(73) Assignee: Johns Manville, Denver, CO (US)

( * ) Notice: Subject to any disclaimer, the term of this patent is extended or adjusted under 35 U.S.C. 154(b) by 282 days.

(21) Appl. No.: 13/113,201

(22) Filed: May 23, 2011

(65) Prior Publication Data

US 2012/0297839 A1 Nov. 29, 2012

(51) Int. Cl.
*C03B 37/095* (2006.01)
*C03B 37/083* (2006.01)

(52) U.S. Cl.
CPC ............ *C03B 37/095* (2013.01); *C03B 37/083* (2013.01)
USPC .............................................. 65/492; 65/495

(58) Field of Classification Search
CPC ............................ C03B 37/095; C03B 37/083
USPC ................................................... 65/492, 495
See application file for complete search history.

(56) References Cited

U.S. PATENT DOCUMENTS

| | | | |
|---|---|---|---|
| 3,334,981 A | 8/1967 | Glaser | |
| 3,597,180 A | 8/1971 | Erickson | |
| 3,859,070 A | 1/1975 | Slonaker | |
| 3,867,119 A | 2/1975 | Kasuga et al. | |
| 3,920,430 A * | 11/1975 | Carey | 65/495 |
| 3,972,702 A | 8/1976 | McCormick et al. | |
| 3,988,135 A | 10/1976 | Coggin, Jr. | |
| 4,055,406 A | 10/1977 | Slonaker et al. | |
| 4,330,311 A | 5/1982 | Jensen | |
| 4,330,312 A | 5/1982 | Hill | |
| 5,643,844 A * | 7/1997 | Yasrebi et al. | 501/152 |
| 5,869,890 A * | 2/1999 | Nishiura et al. | 257/705 |
| 6,196,029 B1 | 3/2001 | Melia et al. | |
| 6,221,506 B1 | 4/2001 | Guerlet et al. | |
| 6,453,702 B1 | 9/2002 | Hanna et al. | |
| 7,434,421 B2 | 10/2008 | Hanna et al. | |
| 7,946,138 B2 | 5/2011 | Thompson et al. | |
| 2002/0074934 A1 | 6/2002 | Beeteson et al. | |
| 2003/0089134 A1 | 5/2003 | Bemis et al. | |
| 2003/0177793 A1 | 9/2003 | Kock et al. | |
| 2006/0065022 A1 | 3/2006 | Sullivan et al. | |
| 2006/0201207 A1* | 9/2006 | Renaudin et al. | 65/495 |
| 2007/0209399 A1 | 9/2007 | Thompson et al. | |
| 2008/0053156 A1 | 3/2008 | Striecher et al. | |
| 2010/0064734 A1 | 3/2010 | Borsa | |

FOREIGN PATENT DOCUMENTS

| | | |
|---|---|---|
| DE | 19803327 A1 | 8/1999 |
| JP | 62128941 A | 6/1987 |
| JP | 02097433 A | 4/1990 |

* cited by examiner

*Primary Examiner* — Queenie Dehghan
(74) *Attorney, Agent, or Firm* — Robert D. Touslee

(57) ABSTRACT

A bushing system includes a bushing having a bottom plate with a plurality of holes from which filaments are drawn. At least one elongated support extends through the bushing generally along a longitudinal axis to hold and stabilize the bushing. To handle the harsh conditions under which the bushing is subjected, the support comprises an alumina-based ceramic that generally resists sagging or excessive expansion and contraction during heating and cooling.

20 Claims, 6 Drawing Sheets

TRANSVERSE ROW BUSHINGS HAVING CERAMIC SUPPORTS

BACKGROUND OF THE INVENTION

Fiberglass is a thin glass fiber, which can be strong, lightweight, and a good insulator. These properties make fiberglass useful for a variety of applications. For example, fiberglass may be used as an insulator (e.g., an electrical insulator, a thermal insulator, or a sound insulator). Fiberglass may also be used in rigid objects, such as automobile panels, metal poles, or sports equipment (e.g., such that the rigid object consists primarily of fiberglass or such that fiberglass reinforces other materials).

Fiberglass can be made by introducing molten glass into a bushing. The bushing includes side walls and a bottom plate to contain the molten glass. The bottom plate (comprising or attached to a tip plate) includes a number of small holes. Thus, a stream of the molten glass flows from each of these holes and underlying tips. These streams may be converted into fibers.

Bushings are subject to harsh conditions. For example, the force caused by the molten material above the bottom plate may cause the bottom plate to sag over time, especially as manufacturers use increasingly larger bushings in order to produce fiberglass at a faster rate. Additionally, bushings are subject to extremely high temperatures, as the glass introduced into the bushings must stay in a molten state. Not only must the bushing withstand the high temperatures, but it must also withstand the heat expansions and subsequent contractions that accompany these temperatures. Thus, it is desirable to use a bushing system that can withstand the harsh conditions of fiber manufacturing.

BRIEF SUMMARY OF THE INVENTION

In one embodiment, the invention provides a bushing system that comprises a bushing having a bottom plate with a plurality of holes from which filaments are drawn. At least one elongated support extends through the bushing generally along a longitudinal axis to hold and stabilize the bushing. To handle the harsh conditions under which the bushing is subjected, the support comprises an alumina-based ceramic that generally resists sagging or excessive expansion and contraction during heating and cooling. In turn, deformation of the bottom plate is significantly reduced, thereby helping to prevent the geometry of the holes from changing. This in turn helps to prevent the breakage of the filaments when drawn through the holes.

In one aspect, a plurality of elongated supports are employed and are spaced apart from each other and aligned with the longitudinal axis. Each of the supports may comprise yttria doped alumina. Further, a frame may be used to receive the elongated supports. This frame may comprise a pair of horizontal rails upon which the support is configured to rest.

In another aspect, the alumina-based ceramic comprises a yttria doped alumina. In one arrangement, the alumina-based ceramic comprises alumina in major part, yttria in minor part and magnesia in minor amount. Further, the minor amount of yttria may be in the range from about 0.1 weight percent to about 5 weight percent.

To produce the alumina-based ceramic, alumina in major part may be combined with yttria oxide in minor amount and magnesium carbonate in minor amount to form an admixture. The admixture may be extruded and sintered at a temperature in the range from about 1550 degrees C. to about 1700 degrees C. Another technique for forming can include isostatic pressing. In some cases, the minor amount of yttria is in the range from about 0.1 weight percent to about 5 weight percent. The minor amount of magnesium carbonate (MgCO3) may be in the range from about 0.01 weight percent to about 1.5 weight percent, and in some cases from about 0.01 weight percent to about 0.2 weight percent. Further, the admixture may be milled and then spray dried prior to extrusion or pressing.

DETAILED DESCRIPTION OF THE INVENTION

As described above, over time, the bottom plate of a bushing may sag due to the load above it. This can cause the holes in the bottom plate to deform, thereby affecting the stream of molten glass that is forced through the hole. In turn, this can interfere with the other glass fibers, essentially ruining the production run. Once deformed, the bushing may need to be re-worked which usually entails melting down the bushing and recasting it. This can be both time consuming and expensive. Moreover, some of the expensive metals used to make the bushing will be lost.

To address this problem, the bottom plate may be supported by elongated supports running in a direction parallel to the plane of the bottom plate. The ends of the supports may rest on a frame surrounding the bushing, such that the supports are supported by the frame. One critical aspect of the invention is to construct these supports such that they only minimally expand/contract and/or sag when subject to extremely harsh production conditions. One exemplary way to accomplish this is by constructing the supports of a material comprising alumina-based ceramic, and in particular a yttria doped alumina.

One particular advantage of using such materials is that the supports may be made smaller, thus requiring less metal on the bushing to hold the supports. Or, the bushing could be may larger while maintaining the size of the cross sectional dimension of the supports, thus increasing production volumes. These efforts may significantly reduce the cost of the bushing. Further, the bushing will have a longer life, further reducing production costs.

Exemplary Bushing System

Figure 1A:
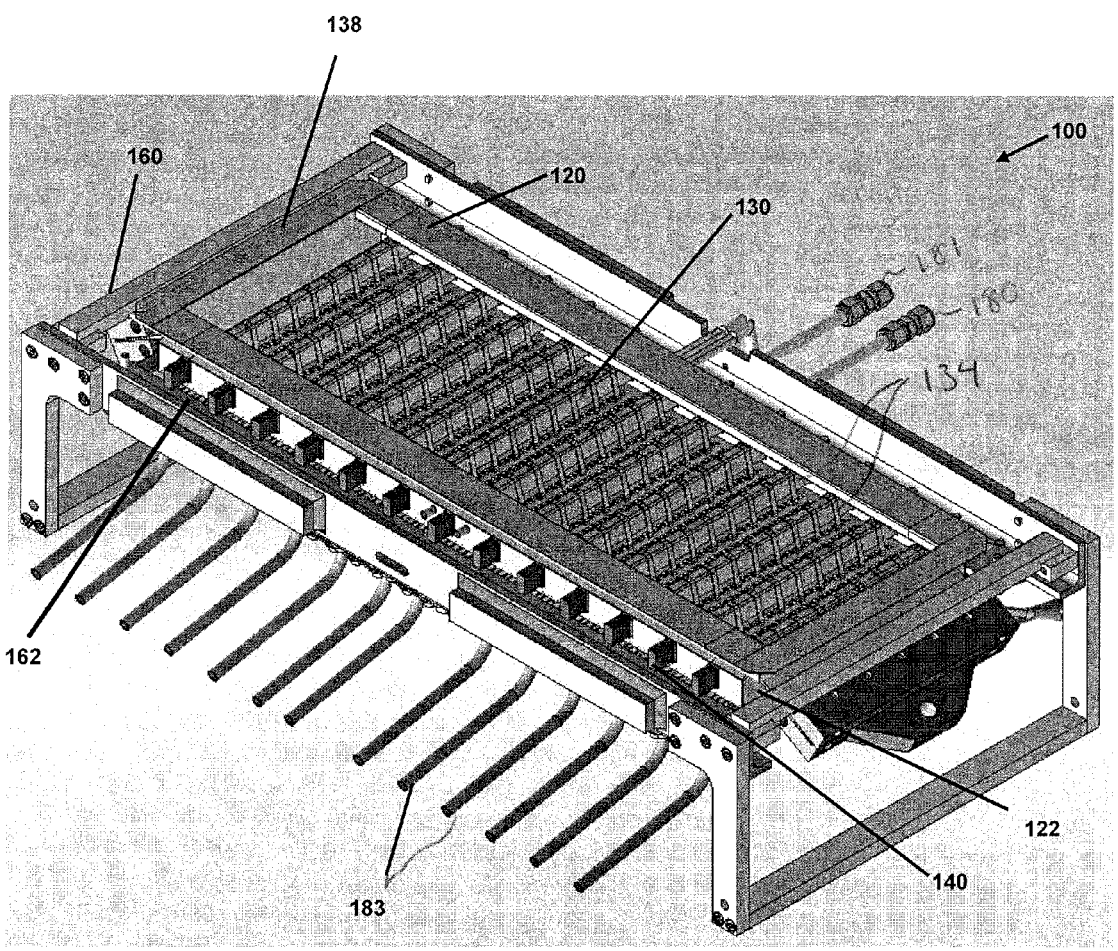
FIGS. 1A-1B show an example of a bushing system 100.
Figure 1B:
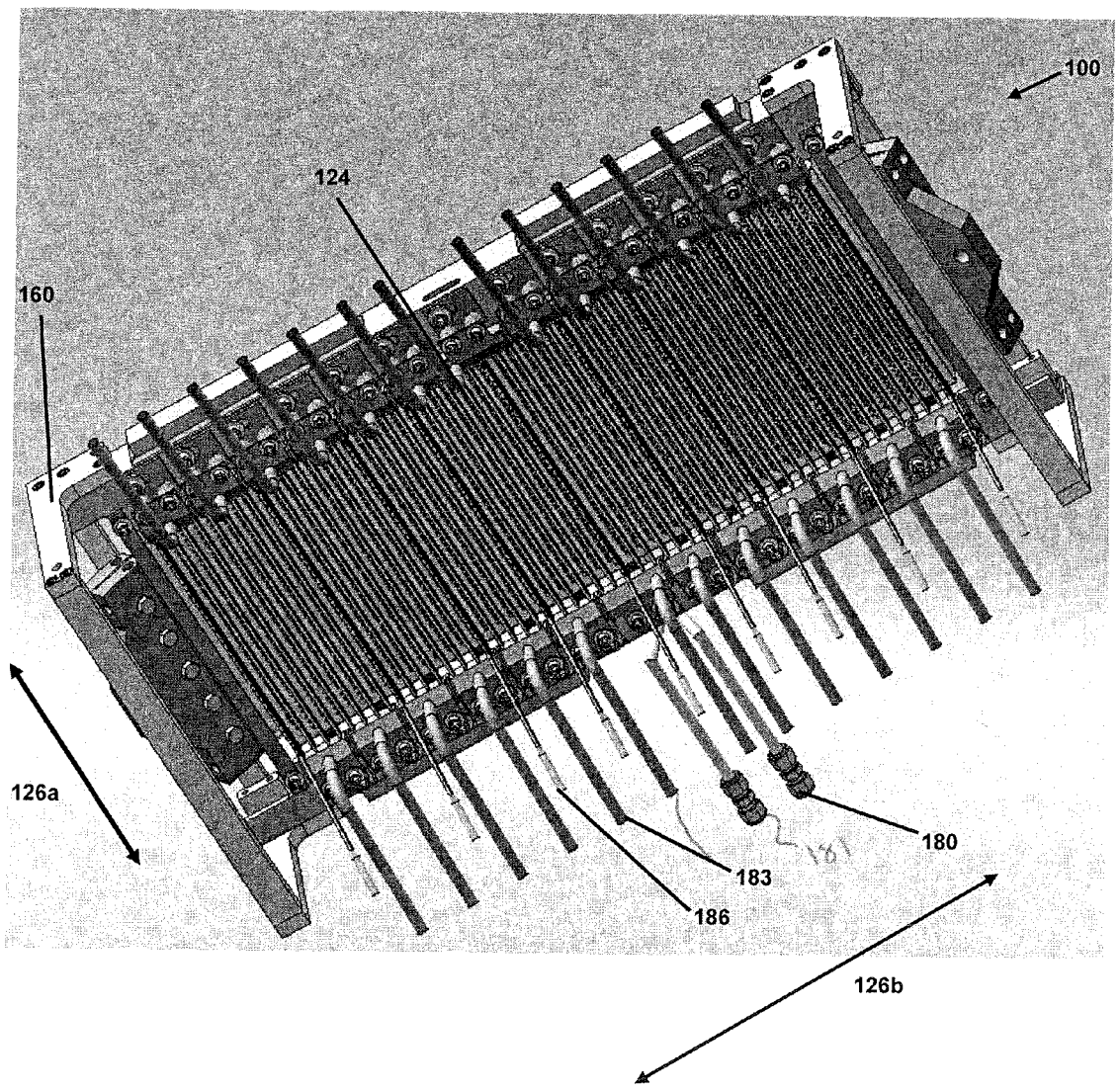

FIGS. 1A and 1B show an example of a bushing system 100. Bushing system 100 may include a bushing 120, which may comprise a material that is substantially erosion-resistant. Bushing 120 may comprise platinum, rhodium, or an alloy thereof.

Figure 2:
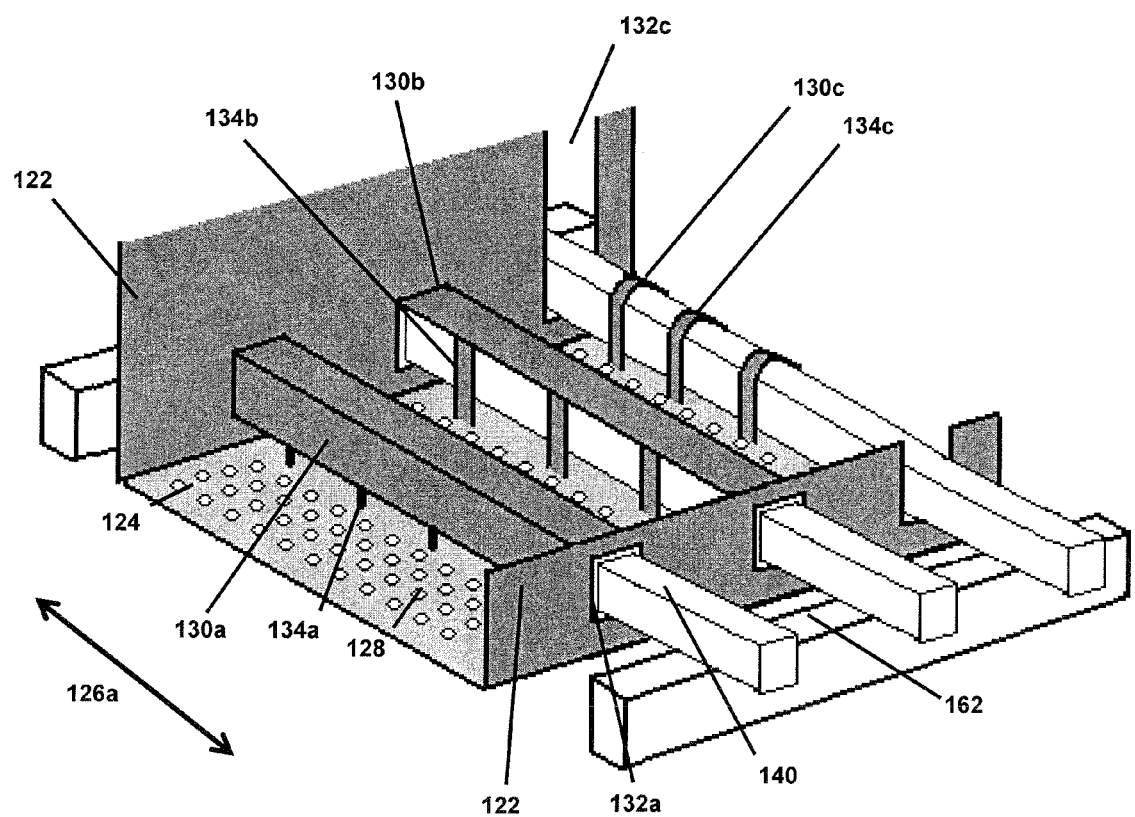
FIG. 2 shows a cut-away depiction of part of a bushing system, illustrating examples of support-receiving elements.
Figure 3A:
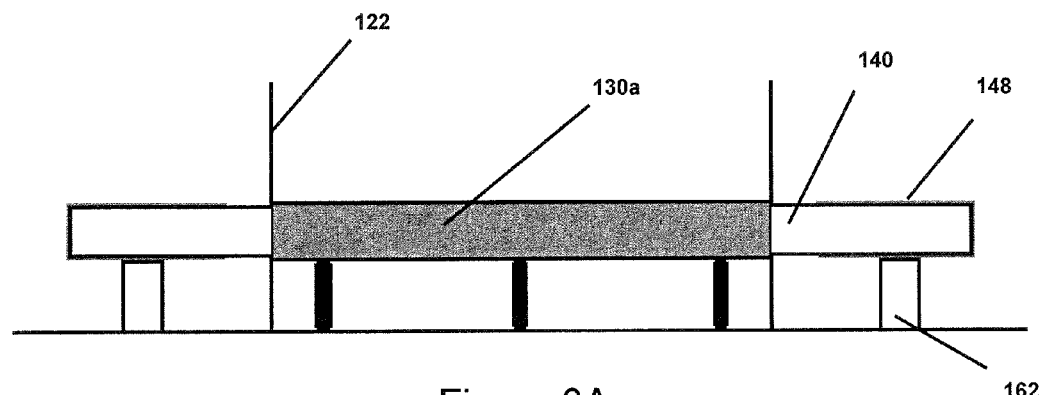
FIGS. 3A-3C, 4, and 5A-5B show front views of a bushing system.
Figure 3B:
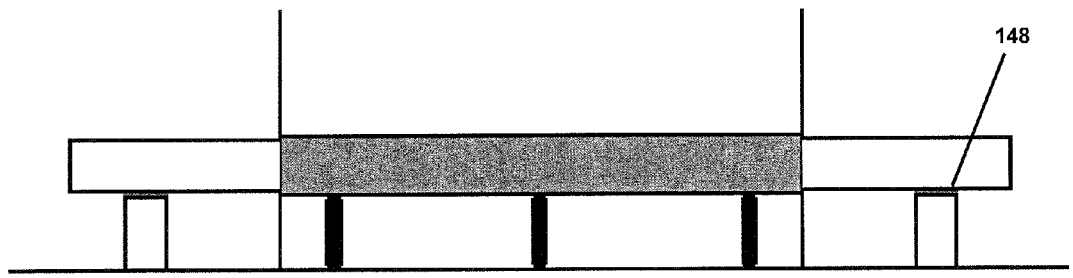
Figure 3C:
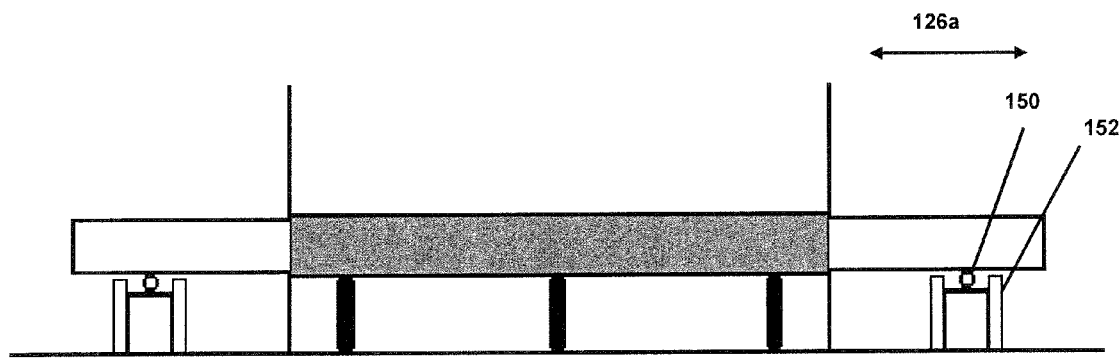
Figure 4:
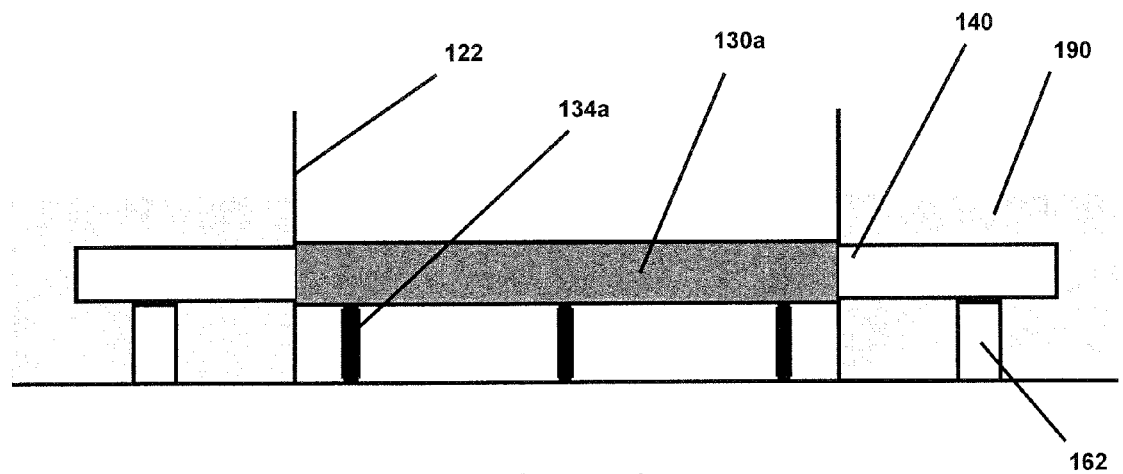
Figure 5A:
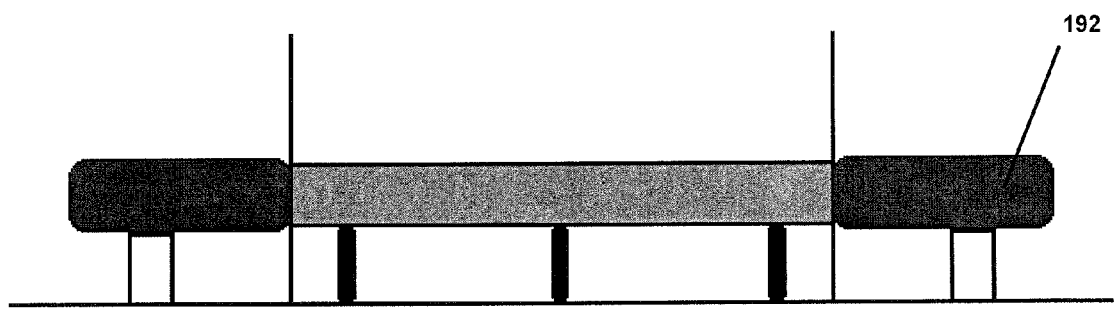
Figure 5B:
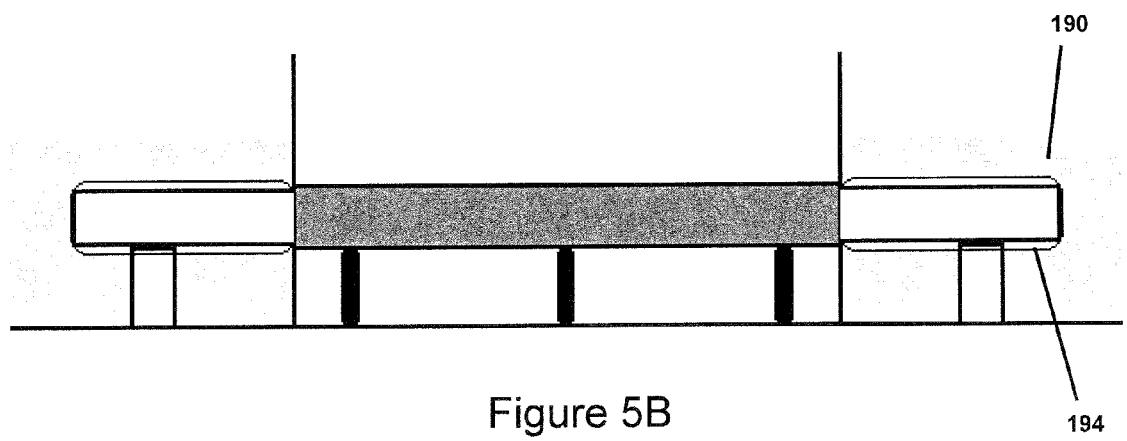

Bushing 120 may comprise a screen (not shown), a number of side walls 122 and a bottom plate 124. The screen may prevent contaminants in a molten material from entering the bushing 120. Bottom plate 124 extends along a longitudinal direction 126a and a horizontal direction 126b, as shown in FIG. 1B. Bottom plate 124 includes a plurality of small orifices or holes 128 (as shown in FIG. 2). In some cases, bottom plate 124 may be similar to the plates described in U.S. Patent Application No. 2010/0064734, incorporated herein by reference. As one example, bottom plate 124 may include at least, equal to, and/or up to about 25, 50, 100, 250, 500, 1,000, 2,500, 5,000 or 10,000 holes.

The diameters of the holes may be at least, equal to, and/or up to about 0.1, 0.25, 0.5, 1, 2.5, 5, 10, 25, 50, 100, 250, 500 or 1,000 m. The holes may be located in rows or staggered double rows. A tip or hollow nozzle may be located beneath each hole and may be connected to, welded to or integral with the hole. As mentioned above, it is critical that these holes not be deformed as this could case the glass stream to break and ruin a production run.

Bushing 120 may comprise a screen (not shown), a number of side walls 122 and a bottom plate 124. The screen may prevent contaminants in a molten material from entering the bushing 120. Bottom plate 124 extends along a longitudinal direction 126a and a horizontal direction 126b, as shown in FIG. 1B. Bottom plate 124 includes a plurality of small orifices or holes 128 (as shown in FIG. 2). For example, bottom plate 124 may include at least, equal to, and/or up to about 25, 50, 100, 250, 500, 1,000, 2,500, 5,000 or 10,000 holes. The diameters of the holes may be at least, equal to, and/or up to about 0.1, 0.25, 0.5, 1, 2.5, 5, 10, 25, 50, 100, 250, 500 or 1,000 m. The holes may be located in rows or staggered double rows. A tip or hollow nozzle may be located beneath each hole and may be connected to, welded to or integral with the hole.

Bushing 120 may include one or more support-receiving elements 130. Side walls 122 may include an aperture 132, which can receive a support 140. In some instances, aperture 132 is only slightly larger than the support 140. Side wall 122 may include an aperture perimeter that defines the shape of aperture 132. In some instances, the aperture perimeter consists of a material different from the rest of side wall 122. The aperture perimeter may be welded to side wall 122.

Support-receiving elements 130 may be constructed in a variety of ways. Three non-limiting examples are illustrated in FIG. 2 and are referenced by reference numerals 130a, 130b and 130c and are described in more detailed hereinafter. It will be appreciated that bushing 120 may include all of the same type of support-receiving elements (e.g., all made of support-receiving elements 130a), or could include combinations of different types of support-receiving elements. Further, the support-receiving elements 130 are coupled in part to bottom plate 124 using one or more connectors 134. As also shown in FIG. 2, a variety of connectors may be used, either the same kind or different kinds. These are referenced using reference numerals 134a, 134b, and 134c and are described in more detail below.

The support-receiving elements may comprise a sleeve, tubular element, hook or the like as described in more detail below. For example, support-receiving element 130 comprises a square or rectangular tube or sleeve that extends between the two side walls 122. Between the side walls, each tubular element 130 is substantially hollow, such that, for example, a support 140 may extend completely through tubular element 130. In some embodiments, the cross-section of tubular element 130 parallels the cross-section of the support 140. Connecting support-receiving element 130 to bottom plate 124 are connectors 134. If a force is applied to bottom plate 124 (e.g., by a molten material on top of the plate) that would promote sagging of the plate, the supports 140 assist to prevent such sagging. More specifically, the top of tubular support-receiving element 130 applies a downward force since it is connected to the bottom plate 124. Support 140 counters this downward force and thus assists in preventing bottom plate 124 from sagging. As such, connecting bottom plate 124 to the support-receiving element may thus reduce or eliminate sagging.

Support-receiving element 130 of FIG. 1A is similar to support-receiving element 130a of FIG. 2. However, it will be appreciated that instead of using a continuous tube as the support-receiving element, other configurations may be used as illustrated in FIG. 2. For example, a single surface may be used to form support-receiving element 130b that sits atop support 140. Bushing 100 may include one or more connectors 134b, which may connect bottom plate 124 with support-receiving element 130b.

As another example, bushing 100 may include a support-receiving element 130c in the form of a hook 134c that also serves to couple the support-receiving element 130c to bottom plate 124. In this way, the support-receiving element and the connector comprise the same component. However, as shown in FIG. 1A a connector 134 similar to connector 134c may also be used in combination with a support-receiving element 130 that is similar to support-receiving element 130a. In FIG. 1A, connector 134 in the form of a hook may extend from bottom plate 124 up and around tubular element 130. Thus, if bottom plate 124 were to begin to sag, and support 140 pressed against the top of tubular element 130, the hook connection may inhibit bottom plate 124 from sagging.

In some embodiments, support-receiving element 130, the perimeter of aperture 132, and/or connector 134 are made of substantially the same material as that of bottom plate 124 of bushing 120. For example, this may allow support-receiving element 130a to expand in longitudinal direction 126a by an amount similar to the expansion of bottom plate 124. In some instances, support-receiving element 130, the perimeter of aperture 132 and/or connector 134 are made of a material that is different from the material of bottom plate 124. For example, support-receiving element 130 and/or connector 134 may comprise a material that is more heat-resistant and/or exhibits less heat expansion than the material of bottom plate 124. In some embodiments, support-receiving element 130, the perimeter of aperture 132, and/or connector 134 comprises a precious metal, such as platinum.

Support 140 may traverse through apertures 132 and/or support-receiving elements 134 along the longitudinal direction 126a. The supports may comprise an elongate member. For example, the length of an elongated support 140 may be at least about 5, 10, 50, 100, 500, or 1000 times greater than a width or height of elongated support 140. Support 140 may have a width or diameter, width, or height that is at least, equal to, or up to about 0.1 mm, 0.5 mm, 1 mm, 5 mm, 10 mm, 50 mm, 100 mm, or 500 mm. Support 140 may have a cross-section that is, for example, round or comprises a substantially straight line. In some instances, the cross-section is substantially a circle, a square, an oval or a rectangle. In some instances, the bottom of the cross-section is substantially flat.

Support 140 may have a width, height, or diameter that is, for example, at least, equal to, or up to about 0.1 mm, 0.5 mm, 1 mm, 5 mm, 10 mm, or 50 mm. Support 140 may have a length that is, for example, at least, equal to, or up to about 10 mm, 50 mm, 100 mm, 500 mm, or 1,000 mm. For example, in one instance, support 140 has a width of approximately 8 mm, a height of approximately 16 mm, and a length of 270 mm. Support 140 may be longer than the length bottom plate 124 in the longitudinal direction 126a. This may, for example, allow the ends of the support 140 to be supported by a frame 160. Support 140 may be, for example, at least equal to, or up to about 0.1 mm, 0.5 mm, 1 mm, 5 mm, 10 mm, 50 mm, 100 mm, or 500 mm longer than the length of bottom plate 124 in the longitudinal direction 126a. Supports may be separated from each other by a length that is, for example, at least, equal to, or up to about 1 mm, 2.5 mm, 5 mm, 10 mm, or 25 mm, 50 mm.

Support 140 may comprise a ceramic material. Support 140 may include alumina, silicon nitride, zirconia, nickel, iron, titanium, tungsten, molybdenum, niobrium or an alloy thereof. The material of support 140 may be such that support 140 has a lower thermal expansion coefficient and/or a greater hot creep strength than does bottom plate 124.

In one particular embodiment, support 140 may comprise a yttria-doped alumina. The yttria doping may allow support 140 to exhibit less creep deformation at high temperatures than an otherwise comparable non-doped support. Thus, using an yttria-doped alumina support may decrease sag of bottom plate 124. Additionally, yttria doping may allow a smaller support 140 to be used to support bottom plate 124 and/or may reduce the amount of materials (e.g., precious metals) to be included in bushing system 100. Alternatively or in addition, yttria doping may allow support 140 to support a larger bottom plate 124 and bushing (thereby increasing a throughput rate of the system), may increase the effective life of support 140, and/or may increase the efficacy of support 140 in inhibiting sag of bottom plate 124. One exemplary yttria-doped ceramic comprises a yttria doped alumina. In one arrangement, the alumina-based ceramic comprises alumina in major part, yttria in minor part and magnesia in minor amount. In one particular embodiment, the minor amount of yttria may be in the range from about 0.1 weight percent to about 5 weight percent.

Manufacture of supports 140 may begin, for example, by providing alumina particles or a mixture of powders which react to form alumina. Combined with the alumina is yttria oxide and magnesium carbonate to form an admixture. The amount of yttria may be in the range from about 0.1 weight percent to about 5 weight percent. The amount of magnesium carbonate may be in the range from about 0.01 weight percent to about 1.5 weight percent.

The admixture is placed into an aqueous solution, such as water, and the admixture is milled to reduce the particle size. Following milling, the admixture is spray dried. The processed admixture may be extruded or pressed to shape the supports in the desired shape. The green body is then sintered at a temperature in the range from about 1550 degrees C. to about 1700 degrees C. During sintering, magnesia is produced from the magnesium carbonate. The end product is cooled and may optionally be ground to smooth and/or straighten the support.

In some embodiments, support 140 may be substantially solid. In some embodiments, support 140 is substantially hollow. In some embodiments, support 140 comprises a hollow and a solid part.

As shown in FIGS. 1A and 1B, frame 160 may support bushing 120. In one embodiment, frame 160 supports an exterior portion of the bushing. For example, the frame may support an outer portion of the bushing surrounding the portion of the bushing comprising holes 128. In some instances, bushing 120 may comprise one or more flanges 138. Flanges 138 may extend over a portion of frame 160. In some instances, flanges 138 extend along longitudinal direction 126a.

Frame 160 may support elongated supports 140. For example, as shown in FIGS. 1A and 1B, supports 140 may extend beyond bushing 120 in the longitudinal direction. Part or all of the portion of the supports extending beyond bushing 120 may be supported by frame 160. In some instances, frame 160 supports bushing 120 by supporting supports 140. In some instances, frame 160 directly supports bushing 120.

Frame 160 may include one, two or more horizontal rails 162, which extend along horizontal direction 126b. Horizontal rails 162 may provide an upward force on supports 140. In some embodiments, one or more lateral portions of supports 140 rest on horizontal rails 162. The lateral portions may, for example, include an end portion of support 140 and/or a portion of the support that is not directly above bottom plate 124. In some embodiments, support 140 does not directly rest on horizontal rails 162, but one or more lateral portions of supports 140 are positioned over horizontal rails 162 and are indirectly supported by the rails. For example, one or more movement-promoting elements 148, 150, 152, 190, 192, 194 may separate the rails from the lateral portions, shown in FIGS. 3A-3C, 4, and 5A-5B.

Frame 160 may comprise a metal. For example, frame 160 may comprise iron or steel. Frame 160 may comprise a material or may itself have a lower thermal expansion coefficient and/or a greater hot creep strength than does bottom plate 124 or than does support 140. In some instances, different parts of frame 160 are made from different materials.

Bushing 160 may be heated in order to ensure that material contained within the bushing is kept within a desired temperature. For example, bushing 160 may be heated to over 2000° F. to ensure that molten glass within the bushing stays in the molten state. These high temperatures may cause parts of bushing 160 and supports 140 to expand. If supports 140 are not free to move with respect to frame 160, damage may be caused to one or more of support 140, bushing 120 (e.g., at aperture perimeters on side wall 122 or support-receiving element 130), and frame 160. For example, at high temperatures, the welding connecting aperture perimeters to side wall 122 may fail and support-receiving element 130 may tear, which may result in molten material (e.g., molten glass) leaking from bushing 120. Thus, in some embodiments, bushing systems are provided that reduce friction, permit relative movement, and/or promote relative movement between supports 140 and frame 160 (e.g., horizontal rails 162) at high temperatures (e.g., 2200°-2400° F.).

Bushing system 100 further includes a cooling water inlet 180 that leads to a cooling loop that lays on top of the bushing flange to seal to the bushing block to keep molten glass from escaping. Adjacent cooling water inlet 180 is a cooling water outlet 181. Also, cooling water tubes 183 permit cooling water to be used to cool the bushing. Tubes 183 extend traverse across the bushing to permit cool water to be input from one side and the water to be removed from the other side. Tubes 186 provide air that is used during hanging to induce outside downward air flow along the array of bushing tips to further provide cooling during fiberization of the primary glass strands.

Support-Receiving Elements

As described above, a bushing may include one or more support-receiving elements. FIG. 2 shows a cut-away depiction of a part of other bushing-system embodiments, which, for example, illustrate several other examples of support-receiving elements 230a-230c. In each of the three depicted example, side walls 222 include an aperture 232, which can receive a support. In some instances, the aperture (e.g., aperture 232a) is only slightly larger than the support 240. In some instances, the aperture (e.g., aperture 232c) extends to the top or to the bottom of the wall. While FIG. 2 shows two apertures corresponding to each support, a side wall 222 may include larger apertures 232 that can receive multiple supports.

As described in connection with FIG. 1A, support-receiving element 230 may be comprise a sleeve or a tubular element. FIG. 2 shows an example where a tubular support-receiving element 230a is used in a bushing. In this instance, tubular element 230a includes a substantially solid, continuous surface extending between two side walls 222. Additionally each tubular element 230a may be substantially hollow, such that, for example, a support 240 may extend completely through tubular element 230*a*. In this instance, the cross-section of tubular element 230*a* parallels the cross-section of the support 240. As described in further detail below, tubular element 230*a* is connected to bottom plate 224 (which comprises holes 228). Thus, if a force is applied to bottom plate 224 (e.g., by a molten material on top of the plate) that would promote sagging of the plate, the supports 240 (being supported by horizontal rails 262) may press on the top of tubular support-receiving element 230*a*. Connecting bottom plate 224 to the support-receiving element may thus reduce or eliminate sagging.

Support-receiving element 230*b* comprises a top surface. Support 240 can then be positioned beneath the top surface. Support 240 may apply an upwards force on the top surface of support-receiving element 230*b* when a downwards force is applied to bottom plate 224 of a bushing. Thus, connecting bottom plate 224 to support-receiving element 230*b* may reduce or eliminate sagging that may otherwise occur.

Support-receiving element 230*c* comprises an element extending from bottom plate 224 over support 240. In some instances, element 230*c* comprises a hook-shape; in some instances, element 230*c* comprises a U-shape. Support 240 may apply an upwards force on the top portion of support-receiving element 230*c* when a downwards force is applied to bottom plate 224 of a bushing. Thus, connecting bottom plate 224 to support-receiving element 230*c* may reduce or eliminate sagging that may otherwise occur.

As describe above, the bushing may include one or more connectors 234, which may connect bottom plate 224 with support-receiving element 230. Connectors 234 may include for example, a rod (e.g., 234*a*), a plate, a bar (e.g., 234*b*), a U-shaped component (e.g., 234*c*) or a hook. Connector 234 may be independent of support-receiving element 230 (e.g., connectors 234*a* and 234*b* are distinct from support-receiving elements 230*a* and 230*b*) or connector 234 may comprise support-receiving element 230 (e.g., connector 234*c* comprises support-receiving element 230*c*).

In some embodiments, bottom plate 224 is rigidly connected to support 240. For example, hooks of connector 234*c* may be firmly attached to support 240, or a shape or material of the hook may discourage movement of support 240 relative to component 234*c*. In some embodiments, connectors 234 and/or support-receiving element 230*c* are configured to allow support 240 to move relative to bottom plate 224. For example, support 240 may be able to slide and/or expand longitudinally (and independently of bottom plate 224) within support-receiving element 230*a*. As another example, hooks of connector 234*c* may permit movement of support 240 relative to component 234*c*.

FIG. 2 shows a plurality of connectors 234 connecting bottom plate 224 to a single support 240. In some instances, support 240 is connected to bottom plate 224 by a single connector. For example, connectors 234 may include a vertically oriented plate that extends across a substantial portion or across the entire bottom plate 224 in the longitudinal direction 226*a*. As another example, a single component (e.g., a post) may be positioned substantially in the center of bottom plate 224 along the longitudinal direction 226*a*.

FIG. 2 shows a variety of support-receiving elements 230 and a variety of connectors 234. A bushing system may include a plurality of support-receiving elements 230 (e.g., to receive multiple supports 240) and a plurality of connectors 234. In some instances, the connectors are all of the same type and/or the support-receiving elements are all of the same type. In other instances, a system may include multiple types of connectors and/or multiple types of support-receiving elements (e.g., as shown in FIG. 2). While FIG. 2 shows pairs between specific types of connectors 234 and support-receiving elements 230, the pairs may be rearranged and/or other types of connectors 234 and support-receiving elements 230 not specifically described herein may be used.

Fiber Manufacturing Process

Figure 6:
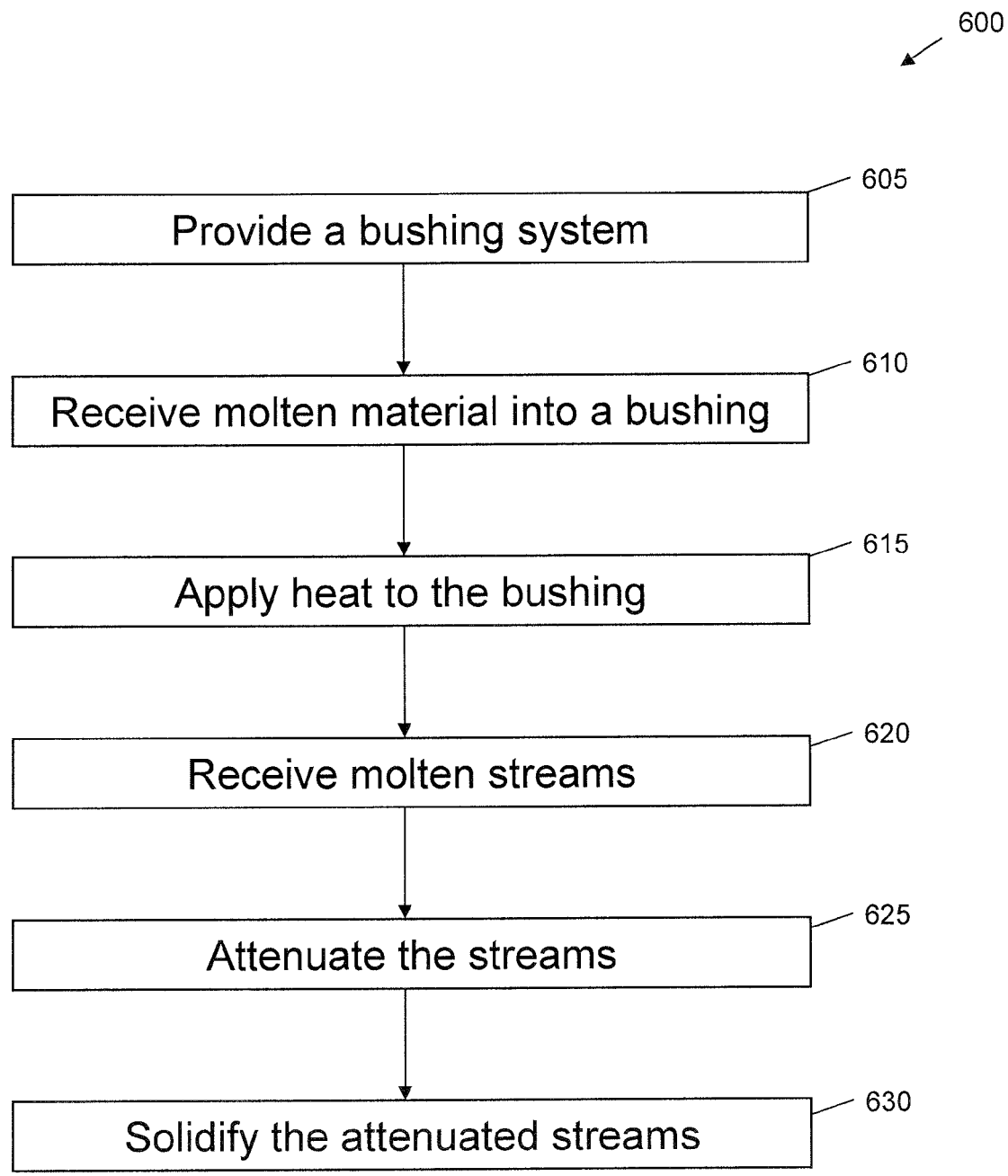
FIG. 6 shows a process for manufacturing fibers.

FIG. 6 shows a process 600 for manufacturing fibers. At 605, a bushing system is provided. The bushing system may include any parts and may have any properties described herein. For example, the bushing system may include a bushing, supports to support a bottom plate of the bushing, a frame to support the supports, a friction-reducing means to reduce the effective friction between the supports and the frame, and a space—void of refractory insulating castable—surrounding a portion of the supports outside the bushing.

At 610, a molten material is received into a bushing of a bushing system. In some instances, a forehearth receives the molten material (e.g., a molten glass) from a refining zone of a melting furnace. While the material is in the forehearth, the temperature of the molten material may decrease and/or the molten material may be mixed. A plurality of refractory lined legs may extend from the forehearth to one or more bushings. The molten material may pass through a screen of the bushing, which may prevent contaminants in the molten material (e.g., fragments from the refractory lined legs) from entering the bushing.

At 615, heat is applied to the bushing. In some instances, bushing is electrically heated, e.g., by applying current to electrical terminals connected to the bushing. The bushing may be heated to a temperature that is within a center or upper portion of a fiberizing range for the material. If the temperature is too high, the material flowing out of holes of the bushing may form into discrete droplets and may not be able to be pulled into fibers. If the temperature is too low, the fiber may subsequently break due to excessive shear stresses during attenuation of the fiber. Thus, the bushing may be maintained at a temperature not associated with either of these disadvantages. The bushing may need to be maintained at a temperature higher than the ideal fiberizing temperature, as cooling may occur within tips under a bottom plate of the bushing. In some instances, the bushing is maintained at a temperature that is at least, equal to, or up to about 1,800° F., 2,000° F., 2,200° F., 2,400° F., 2,600° F., or 2,800° F. The temperature may be one which allows the molten material to exit tips underlying a bottom plate in the upper portion of the fiberizing range, such that the molten material exiting the tips forms into cones at the end of tip.

At 620, molten streams (produced through holes of the bushing) are received. In some instances, the molten material itself creates a sufficient head pressure to cause the material to exit through holes on a bottom plate, thereby forming molten streams. The streams may be received closely below each tip end under the bottom plate. In some instances, the molten streams comprise a molten cone formed under tips underlying the bottom plate. For example, they may be received within a fraction of an inch below the tip end. A high-speed winder may catch the streams and may subsequently attenuate them.

At 625, the streams are attenuated. During attenuation, the diameter of the streams may be decreased by a factor of, for example, at least, equal to, or up to about 2, 5, 10, 20, 50 or 100, to result in diameters of, for example, at least, equal to, or up to about 1, 5, 10, 13, 16, 19, 25, 50 or 100 microns. The winder may apply tension and pull the streams at hundreds to thousands of feet per minute to reduce the diameter. The molten material may be cooled during the attenuation. At 630, the attenuated streams are solidified by continuing to cool the material.

What is claimed is:

1. A bushing system comprising:
a bushing comprising a bottom plate having a plurality of holes from which filaments are drawn, the bottom plate having a longitudinal axis;
a first side wall on a first side of the bottom plate extending perpendicular to the longitudinal axis;
a second side wall on a second side of the bottom plate extending perpendicular to the longitudinal axis;
at least one elongated support extending through at least one support receiving element of the bushing generally along the longitudinal axis and applying an upwards force on the bottom plate of the bushing, wherein a bottom of the support is directly above a top of the bottom plate, and each of the at least one support receiving element comprises a plurality of connectors coupling the support receiving element with the bottom plate between the first side wall and the second side wall; and
wherein the support comprises an alumina-based ceramic.

2. The bushing system of claim 1, further comprising a plurality of elongated supports that are spaced apart from each other and aligned with the longitudinal axis, wherein each of the supports comprises yttria doped alumina.

3. The bushing system of claim 1, further comprising a frame configured to support the elongated support, wherein the frame includes a pair of horizontal rails upon which the support is configured to rest.

4. The bushing system of claim 1, wherein the alumina-based ceramic comprises a yttria doped alumina.

5. The bushing system of claim 1, wherein the alumina-based ceramic comprises alumina, yttria and magnesia.

6. The bushing system of claim 1, wherein an amount of yttria in the alumina-based ceramic is in the range from about 0.1 weight percent to about 5 weight percent.

7. The bushing system of claim 1, wherein the at least one support receiving element comprises a hook shaped element hanging from the at least one elongated support.

8. The bushing system of claim 1, wherein the at least one support receiving element comprises a U-shaped element hanging from the at least one elongated support.

9. The bushing system of claim 1, wherein the at least one support receiving element composes a planar element supported by the at least one elongated support, and the plurality of connectors couple the planar element with the bottom plate.

10. The bushing system of claim 1, wherein the at least one elongated support is characterized by a cross section having a circle perimeter.

11. The bushing system of claim 1, wherein the at least one elongated support is characterized by a cross section having arm oval perimeter, 12. The bushing system of claim 1, wherein the at least one elongated support is characterized by a cross section having an square perimeter.

13. A bushing system comprising:
a bushing comprising a bottom plate having a plurality of holes from which filaments are drawn, the bottom plate having a longitudinal axis;
at least one elongated support extending through the bushing generally along the longitudinal axis and applying an upwards force on the bottom plate of the bushing, wherein the bottom plate is directly beneath the support;
a frame comprising at least two horizontal rails upon which the at least one elongated support is supported;
a movement promoting element disposed between the frame and the at least one elongated support and wherein the support comprises an alumina-based ceramic that is produced according to a method comprising the steps of:
combining alumina, yttria and magnesium carbonate into an admixture;
extruding the admixture; and
sintering the admixture at a temperature in the range from about 1550 degrees C. to about 1701 degrees C.

14. The bushing system of claim 13, wherein an amount of yttria in the alumina-based ceramic is in the range from about 0.1 weight percent to about 5 weight percent.

15. The bushing system of claim 13, wherein an amount of magnesium carbonate in the admixture is in the range from about 0.01 weight percent to about 1.5 weight percent.

16. The bushing system of claim 13, wherein the method of producing the alumina-based ceramic further comprises milling the admixture and spray drying the milled admixture.

17. A bushing system comprising:
a bushing comprising a bottom plate having a plurality of holes from which filaments are drawn, the bottom plate having a longitudinal axis;
a first side wall on a first side of the bottom plate extending perpendicular to the longitudinal axis, the first side wall defining at least a first aperture open at a top edge of the first side wall;
a second side wall on a second side of the bottom plate extending perpendicular to the longitudinal axis, the second side wall defining at least a second aperture open at a top edge of the second side wall; and
at least one elongated support extending through at least one support receiving element of the bushing generally along the longitudinal axis and applying an upwards force on the bottom plate of the bushing;
a frame comprising at least two horizontal rails upon which the at least one elongated support is supported;
a movement promoting element disposed between the frame and the at least one elongated support, and wherein:
the at least one elongated support extends through the first aperture and the second aperture;
a bottom of the support is directly above a top of the bottom plate;
each of the at least one support receiving element comprises a plurality of connectors coupling the support receiving element with the bottom plate between the first side wall and the second side wall; and
the support comprises an alumina-based ceramic.

18. The bushing system of claim 17, wherein the at least one support receiving element, comprises a selection from a group consisting of;
a hook shaped element hanging from an elongated support;
a U-shaped element hanging from an elongated support; and
a planar element supported by an elongated support, and the plurality of connectors couple the planar element with the bottom plate.

19. The bushing system of claim 17, wherein the at least one elongated support is characterized by a selection from a group consisting of:
a cross section having a circle perimeter;
a cross section having an oval perimeter; and
a cross section having a square perimeter.

20. The bushing system of claim 17, wherein the alumina-based ceramic comprises alumina, yttria and magnesia.

* * * * *